United States Patent [19]
Watson

[11] 3,827,046
[45] July 30, 1974

[54] FILTERED DUTY CYCLE FEEDBACK ANALOG TO DIGITAL CONVERTER

[75] Inventor: George A. Watson, Tustin, Calif.

[73] Assignee: Rockwell International Corporation, El Segundo, Calif.

[22] Filed: Apr. 25, 1973

[21] Appl. No.: 354,297

[52] U.S. Cl. .......... 340/347 AD, 235/154, 325/38 B, 332/11 D, 324/99 D
[51] Int. Cl. .......... H03k 13/02
[58] Field of Search .......... 340/347 AD; 235/154; 325/38 B; 332/11 D; 324/99 D

[56] References Cited

UNITED STATES PATENTS

| | | | |
|---|---|---|---|
| 3,555,423 | 1/1971 | Weston | 325/38 B |
| 3,699,566 | 10/1972 | Schindler | 340/347 AD |
| 3,706,944 | 12/1972 | Tewksbury | 332/11 D |

OTHER PUBLICATIONS

Choquet et al. "IBM Technical Disclosure Bulletin" Vol. 15 No. 7 Dec. 1972 pg. 2054–2055.

*Primary Examiner*—Charles D. Miller
*Attorney, Agent, or Firm*—H. Fredrick Hamann; G. Donald Weber, Jr.

[57] ABSTRACT

A filtered duty cycle analog to digital converter is provided which includes at least one electrical sensor for producing a signal which varies as an analog representative of a specific parameter. The analog signal is converted to a digital signal. The analog signal and a signal representative of the digital signal are compared whereby the digital signal may be corrected to reflect changes in the analog signal as caused by changes at the electrical sensor.

5 Claims, 1 Drawing Figure

PATENTED JUL 30 1974 3,827,046
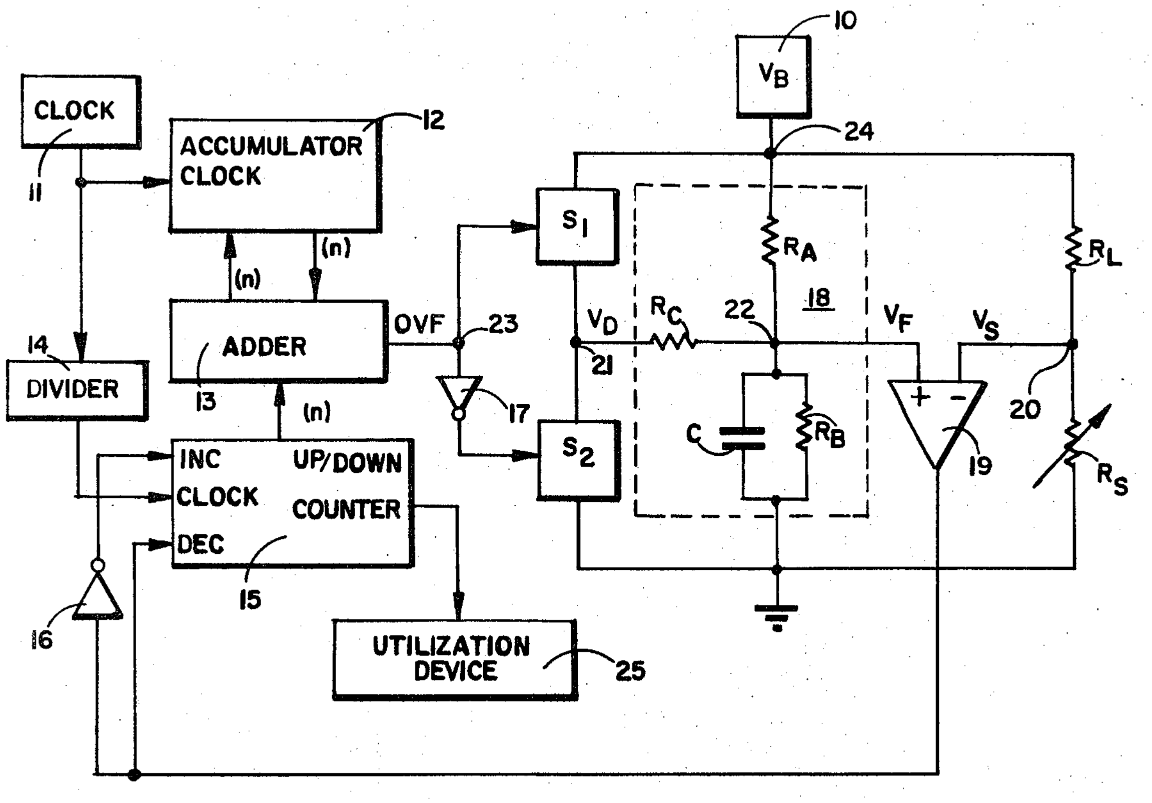

FILTERED DUTY CYCLE FEEDBACK ANALOG TO DIGITAL CONVERTER

BACKGROUND OF THE INVENTION

Many analog to digital (A/D) converters are known in the art. Many of these A/D converters include analog sensors which operate as a function of variable resistance thereof. Typical sensors are thermistors nichrome wire or the like. In these typical sensors, the resistance thereof varies as a function of temperature. Of course, in a particular application, a sensor which has an appropriate bandwidth and an appropriate parameter sensitive to a phenomenom to be measured, can be utilized in most analog to digital converters.

Analog to digital converters are especially useful where analog signals are to be converted to digital signals for utilization with digital control computers. This type of application finds widespread usage including electronic fuel metering and fuel injection systems utilizing digital control computers.

SUMMARY OF THE INVENTION

A variable resistor is used to produce an analog voltage signal at a specified circuit node. The analog voltage is converted to a digital signal. A feedback signal, representative of the digital signal, is compared with the analog signal. The difference between the feedback signal and the analog signal is used to control the digitizing circuit wherein the analog signal is digitized. A filter circuit is connected between the digital circuit portion and the comparator to control the digitized signal and to smooth the feedback signal.

BRIEF DESCRIPTION OF THE DRAWINGS

The single FIGURE shows a partially block, partially schematic diagram of one embodiment of the analog to digital converter included in this invention.

DESCRIPTION OF THE PREFERRED EMBODIMENT

A suitable source 10 for producing a substantially constant voltage is connected, via node 24, to one terminal of resistor $R_L$. Resistor $R_L$ is a calibration resistor and, in some applications, may be omitted. The other terminal of resistor $R_L$ is connected to one terminal of variable resistor $R_S$ at node 20. The other terminal of resistor $R_S$ is connected to a suitable reference potential, for example ground. Resistor $R_S$ may be a temperature sensitive resistor such as a thermistor on a nichrome wire as suggested supra. The analog voltage $V_S$ is produced at node 20. That is, resistors $R_L$ and $R_S$ function as a voltage divider between source 10 and ground. The voltage $V_S$ is a function of the values of resistors $R_L$ and $R_S$. The equation for $V_S$ is as follows:

$$V_S + (R_S/R_S + R_L) \cdot V_B$$

The signal $V_S$ is supplied to the inverting input terminal of differential comparator 19. The non-inverting input terminal of comparator 19 is connected to node 22 to receive the feedback voltage signal $V_F$. Feedback voltage $V_F$ is produced by a filter circuit shown in dash outline 18. Filter circuit 18 includes resistors $R_A$ and $R_B$ connected in series between source 10 (i.e. node 24) and ground. The common junction thereof is formed at node 22.

Capacitor C is connected in parallel with resistor $R_B$ and between node 22 and ground. In addition, resistor $R_C$ is connected between node 22 and node 21. Node 21 is connected to one terminal of each of switches S1 and S2. Switch S2 is connected between node 21 and node 24 (i.e. source 10) while switch S2 is connected between node 21 and ground. Voltage $V_D$ (a voltage representative of the digitized voltage) is produced at node 21. An enabling signal OVF (overflow) is produced at node 23 which is connected directly to switch S1 and to switch S2 via inverter 17. Thus, switches S1 and S2, each of which is enabled by a true or high level input signal, are mutually exclusively operable.

Node 23 is connected to the output terminal of adder 13. Adder 13 which produces the OVF signal, is connected to receive and supply, in parallel, a multibit signal (comprising $n$ bits) to and from accumulator 12. Typically, accumulator 12 comprises a plurality of flip flops individually connected to the stages of adder 13. Accumulator 12 also receives clock signals from clock source 11. Clock source 11 provides a relatively high frequency signal. In a preferred embodiment, source 11 may supply a signal having a frequency of about 33OKHZ. The clock signal from source 11 is also connected to divider 14 which supplies a second clock signal to the clock input terminal of up/down counter 15. Up/down counter 15 supplies a multibit ($n$ bits) signal to adder 13. The decrementing input terminal of up/-down counter 15 is connected directly to the output of differential comparator 19. In addition, the output of comparator 19 is connected to the incrementing input terminal of counter 15 via inverter 16. Consequently, upon the application of a clock signal from divider 14, counter 15 will be incremented (or decremented) by each signal produced by comparator 19. The output terminal of counter 15 is connected to a suitable utilization device 25. While a serial connection is shown, a parallel connection and transfer is also contemplated.

In operation, clock source 11 supplies the relatively high frequency clock signals to the clock input terminal of accumulator 12. Upon application of the clock signals, each flip flop in accumulator 12 is switched to copy (i.e. store) the signal previously stored on the associated stages of adder 13. This transfer of information usually takes place on leading (or trailing) edge of a clock signal. Thereafter, the signal thus stored in accumulator 12 is returned adder 13. This operation or accumulative recirculation, continues with each clock signal whereby the signal stored in accumulator 12 and, thus, adder 13 increases in a linear modulo $2^n$ ramp like fashion.

In addition, the clock signals are supplied to divider 14 which divides the clock signal by a function related to the bit length of the signal stored in accumulator 12. In the preferred embodiment, the clock signal is divided by a factor of $2^n$. This second clock signal, i.e. CLK/$2^n$, is applied to the clock terminal of up/down counter 15. Clearly, counter 15 is clocked or operated at a much slower rate than accumulator 12. Then counter 15 is clocked, the input incrementing or decrementing signal is operable on counter 15. The signal in the up/down counter 15 is a direct function of the output signal produced by differential comparator 19.

The signal contents of counter 15 continuously supplied to adder 13 and added to the contents thereof. Since the contents of adder 13 is added to the contents of accumulator 12 on the next clock signal from source 11, the contents of both accumulator and adder reflects the change dictated in counter 15. Thus, the contents of counter 15 is added to the contents of accumulator 12 at a periodic frequency $f_c$ which is determined by the frequency of the clock signal. This additive process also exhibits a corresponding period $T_c$.

The contents of counter 15 and the contents of accumulator 12 each comprise $n$ bits. If the most significant bit of the contents of accumulator 12 is added to the most significant bit of the contents of counter 15, overflow bits will occur periodically as a result of the additions (as controlled by the clock signal). These overflow bits constitute overflow voltage, OVF. It will be seen that after $2^n$ bit times, the number of overflows is given by:

No of overflows $= 2^n\ (N/2^n) = N$

The overflow output of adder 12, namely voltage OVF, is a binary signal. This signal has duty cycle, $d$, which is proporational to the integer N, i.e. the contents stored in up/down counter 15. The duty cycle averaged over $2^n$ clock times is equal to the number of overflows multiplied by the duration of each overflow, divided by the period of $2^n$ clock times and may be written as follows:

$$d = (NT_c/2^nT_c) = (N/2^n)$$

It may be seen that if $N$ remains constant, the overflow signal OVF is a periodic signal whose period $T_d$ is always less than or equal to $2^nT_c$ or:

$$T_d \leq 2^nT_c$$

In view of the relative frequencies of operation, i.e. counter 15 is much slower than adder 13, N appears to remain constant during a typical operation.

The signal OVF from adder 13 is used to directly control the generation of the signal $V_D$. That is, signal voltage $V_D$ is generated by selectively connecting node 21 to $V_B$ or ground via switches S1 and S2. Switch S1 is closed, thereby connecting source $V_B$ to node 21, when signal OVF is true. Conversely, switch S2 is closed whereby node 21 is connected to ground, whenever signal OVF is false. Obviously, when S1 is closed, switch S2 is opened and vice versa. Moreover, it should be readily apparent that the duty cycle and period of signal $V_D$ are the same as they duty cycle and period of signal OVF. Also, since the DC component of a binary voltage such as $V_D$ is proportional to its duty cycle, said D component is also proportional to N. The DC, or low frequency, component of signal $V_D$ varies between $V_B$ and ground in accordance with the duty cycle of signal OVF which controls the operation of switches S1 and S2. If OVF has a high duty cycle, switch S1 will be closed more often and, thus, more than switch S2. Consequently, $V_D$ will have a relatively high voltage level low frequency component, i.e. nearer to voltage $V_B$, at node 21. Of course, the converse operation produces the opposite voltage condition.

The signal $V_D$ is supplied to the filter circuit shown inside dashed outline 18. Low pass filter circuit 18 operates upon voltage $V_D$ to effectively smooth the pulsating action thereof. The filter circuit provides a reasonably constant output signal $V_F$ (i.e. feedback voltage) as a function of the input signal $V_D$. The DC component of the feedback signal $V_F$ varies between $V_{F\ min.}$ and $V_{F\ max.}$ in a manner controlled by and corresponding to the value of N (i.e. the number of overflows at adder 13). That is, $$V_F = V_{F\ min.} + (V_{F\ max.} - V_{F\ min.})\ (N/2^n)$$

where $$V_{F\ min.} = R_BR_AR_B + R_BR_C + R_AR_C)\ V_B$$

$$V_{F\ max.} = R_B(R_A + R_C)/(R_AR_B + R_BR_C + R_AR_C)\ V_B$$

By appropriately choosing the resistance values of resistors $R_A$ and $R_B$ relative to resistor $R_C$, the voltages $V_{F\ min.}$ and $V_{F\ max.}$ can be set equal to the minimum and maximum values of $V_S$, respectively. Since $V_{S\ min.}$ and $V_{S\ max.}$ are functions of $R_{S\ min.}$ and $R_{S\ max.}$, it can be shown that $(R_A/R_C) = (V_{S\ max.}/V_{S\ min.}) - 1 = [R_L(R_{S\ max.} - R_{S\ min.})/R_{S\ min.}\ (R_{S\ max.} + R_L)]$ $(R_A/R_C) = (V_{S\ max.} - V_{S\ min.}/V_B - V_{S\ max.}) = (R_{S\ max.} - R_{S\ min.}/R_{S\ min.} + R_L)$ The time constant for the filter circuit is dependent upon values of $R_A$, $R_B$, $R_C$ and capacitor C. The time constant is given by the equation:

$$T_F = (R_AR_BR_C)/(R_AR_B + R_BR_C + R_AR_C)\ C$$

This time constant must be sufficiently large so that the output signal $V_F$ does not change by more than one least significant bit resolution over the period of the OVF waveform. The time constant can be defined as:

$$T_F \geq 2^nT_c$$

Also, if the time constant is too large, it will reduce the bandwidth of operation of the converter.

Resistors $R_L$ and $R_S$ form a voltage divider between source 10 (i.e. voltage $V_B$) and ground. A sensed or signal voltage $V_S$ is detected at node 20. The voltage $V_S$ varies as the resistance of resistor $R_S$ varies. Resistor $R_S$ varies as a function of temperature or other phenomena being measured. The signal voltage $V_S$ represents the changes (if any) of a particular function represented by resistor $R_S$. This signal is an analog form. To be useful in a digital computer, the analog signal must be digitized as for example in up/down counter 15. The digitized signal is supplied to utilization device 25.

In order to update the digitized signal to current conditions at the sensor $R_S$, the digitized signal and the sensed signal are compared. The signal voltage $V_S$ at node 20 and the feedback voltage $V_F$ at node 22 are, as noted supra, supplied to differential comparator 19. Comparator 19 compares these signals and produces an output signal which is a function of the diffeence between the signal voltage and the feedback voltage. The output signal from differential comparator 19 is used to increment or decrement counter 15 depending upon the sign of the output signal. Up/down counter 15 is clocked once during each period of $2^n$ clock times as described supra. Consequently, with the application of each clock signal, the signal stored in counter 15 is changed in the appropriate direction (as a function of the signal applied to the increment and decrement counter inputs). As the contents of counter 15 is changed in response to the signal from comparator 19, the contents of adder 13 and accumulator 12 change. These changes, when incorporated into this operation of the adder and the accumulator, vary the rate or number of overflows and, thus, voltage OVF. As OVF changes, voltages $V_D$ and $V_F$ change. Consequently, the voltage $V_S$ is "servoed" until the signal produced by comparator 19 dithers alternately true and false. Thus, the contents of counter 15 will not change (except the least significant bit) and voltage OVF remains substantially constant. Filter circuit 18 is capable of smoothing the relatively high frequency ripple which may be present in the $V_D$ signal whereby voltage $V_F$ is a relatively smooth analog signal. This relatively smooth signal can be better compared with the analog signal $V_S$ to produce the appropriate output signal from comparator 19.

Thus, there is shown a circuit for converting an analog signal generated by an analog sensing device into a digital signal which is used in a digital application such as digital computer. The digital signal is applied to a circuit which, in essence, converts the digital signal back to an analog signal. A filter circuit improves this converted analog signal for feedback and comparison purposes relative to the original analog signal. Thus, the relationship between the digital signal and the original analog signal can be continuously updated and the digital signal can be a more nearly current, accurate representation of the analog signal. A particular advantage of this technique is that a minimum number of precision analog components are required and the conversion from analog to digital signals is independent of power supply voltage. The converter is not limited to any particular type of sensor so long as the sensor has an appropriate bandwidth. In this embodiment, the sensor uses resistance as a parameter sensitive to a phenomenom (such as temperature) to be measured and digitized with this technique.

Obviously, those skilled in the art will recognize that certain modifications to this converter can be provided. For example, the calibrating resistor $R_L$ could be eliminated in some cases. In other cases, a calibration resistor at opposite ends of the sensor resistor could be used. The relative sizes of the calibration and sensor resistors as a function of sensitivity required and/or desired in the system. Also, a preferred relationship between the clock frequencies, the bit number $n$, the filter time constant and the bandwidth of the sensor can be established. Other modifications could be made in the specific nature of the contents of the various digital circuits and the interaction therebetween. However, any modifications to this invention, which are included within the perview thereof, are intended to be included in this description. The specific limitations recited herein are not intended to limit the scope of the invention. Rather, the invention is to be construed in conjunction with the appended claims.

Having thus described a preferred embodiment of the invention, what is claimed is:

1. In combination, signal voltage means, feedback voltage means, comparator means connected between said signal voltage means and said feedback voltage means, counter means connected to said comparator means to receive a control signal therefrom, signal supplying means connected to said counter means to alter the operation thereof as a function of said control signal, accumulator means connected to receive signals from said signal supplying means, adder means connected to add the contents of said adder to the contents of said accumulator at a first periodic rate and to add the contents of said counter to the contents of said accumulator at a second periodic rate, and switch means connected to said adder to be activated thereby to selectively control the operation of said feedback voltage means.

2. The combination recited in claim 1 wherein said feedback voltage means includes low pass filter means.

3. The combination recited in claim 1 wherein said counter means is an up/down counter.

4. The combination recited in claim 1 wherein said signal voltage means includes voltage divider means connected across a voltage source, and said voltage divider means includes at least one variable element from which said signal voltage is obtained.

5. The combination recited in claim 1 wherein said switch means selectively connects a reference voltage source to said feedback voltage means to change the value of the feedback voltage.

* * * * *

PO-1050
(5/69)

UNITED STATES PATENT OFFICE
CERTIFICATE OF CORRECTION

Patent No. 3,827,046 Dated July 30, 1974

Inventor(s) George A. Watson

It is certified that error appears in the above-identified patent and that said Letters Patent are hereby corrected as shown below:

Column 5, line 28, change "nomenom" to --nomenon--,
line 36, change "as" to --is--.

Column 6, after "Claim 5" (in its entirety), insert

--6. The combination recited in Claim 1 including utilization means connected to said counter means to receive output signals therefrom.--

Signed and sealed this 24th day of December 1974.

(SEAL)
Attest:

McCOY M. GIBSON JR.
Attesting Officer

C. MARSHALL DANN
Commissioner of Patents